US010892658B2

(12) United States Patent
Jang et al.

(10) Patent No.: US 10,892,658 B2
(45) Date of Patent: Jan. 12, 2021

(54) MOTOR WITH BUS-BAR ASSEMBLY

(71) Applicant: NEW MOTECH CO., LTD., Gwangju (KR)

(72) Inventors: Jeong Cheol Jang, Gwangju (KR); Je Hyung Seo, Gwangju (KR); Seong Jin Lee, Naju-si (KR)

(73) Assignee: NEW MOTECH CO., LTD., Gwangju (KR)

( * ) Notice: Subject to any disclaimer, the term of this patent is extended or adjusted under 35 U.S.C. 154(b) by 422 days.

(21) Appl. No.: 15/517,966

(22) PCT Filed: Sep. 15, 2015

(86) PCT No.: PCT/KR2015/009649
§ 371 (c)(1),
(2) Date: Apr. 10, 2017

(87) PCT Pub. No.: WO2016/088989
PCT Pub. Date: Jun. 9, 2016

(65) Prior Publication Data
US 2017/0310183 A1  Oct. 26, 2017

(30) Foreign Application Priority Data

Dec. 4, 2014 (KR) .................. 10-2014-0172595

(51) Int. Cl.
*H02K 3/28* (2006.01)
*H02K 3/52* (2006.01)
(Continued)

(52) U.S. Cl.
CPC ............. *H02K 3/28* (2013.01); *H02K 1/2786* (2013.01); *H02K 3/522* (2013.01); *H02K 5/22* (2013.01);
(Continued)

(58) Field of Classification Search
CPC ........ H02K 2203/09; H02K 3/28; H02K 3/50; H02K 3/52; H02K 3/521; H02K 3/522;
(Continued)

(56) References Cited

U.S. PATENT DOCUMENTS 5,157,293 A * 10/1992 Escaravage ............... H02K 3/50
310/43
5,552,650 A * 9/1996 Cap ......................... H02K 1/187
277/419
(Continued)

FOREIGN PATENT DOCUMENTS

DE          29908718 U1 *  8/1999  ............. H02K 3/522
JP          2007-318885 A   12/2007
(Continued)

OTHER PUBLICATIONS

DE-29908718-U1 (English Translation) (Year: 1999).*
(Continued)

*Primary Examiner* — Quyen P Leung
*Assistant Examiner* — Alexander Moraza
(74) *Attorney, Agent, or Firm* — Revolution IP, PLLC

(57) ABSTRACT

Disclose herein is a motor. The motor includes a stator assembly that has a stator core, an upper insulator covering and insulating an upper portion of the stator core, and a lower insulator covering and insulating a lower portion of the stator core, and a bus-bar assembly that has a bus-bar having a plurality of connecting terminals formed on a circular bus and a contact portion electrically connected to a coil, and a bus-bar housing accommodating the bus-bar therein. The contact portion has a bent portion formed by bending distal ends of the connecting terminals upward, a contact piece located to face the bent portion, and a connection piece which connects the bent portion with the contact piece, and the bus-bar housing is coupled to a (Continued)

bus-bar seat defined in a central portion of the upper insulator.

3 Claims, 9 Drawing Sheets

(51) Int. Cl.
*H02K 5/22* (2006.01)
*H02K 1/27* (2006.01)

(52) U.S. Cl.
CPC ......... *H02K 5/225* (2013.01); *H02K 2203/09* (2013.01)

(58) Field of Classification Search
CPC .... H02K 1/2789; H02K 21/22; H02K 21/222; H02K 1/187; H02K 5/16; H02K 5/22; H02K 2211/03; H02K 2203/12
USPC ...... 310/71, 89, 90, 194, 214, 208, 265, 156
See application file for complete search history.

(56) References Cited

U.S. PATENT DOCUMENTS

| | | | |
|---|---|---|---|
| 2007/0273221 A1 | 11/2007 | Kinoshita et al. | |
| 2010/0187920 A1* | 7/2010 | Best | H02K 5/10 310/43 |
| 2011/0050138 A1* | 3/2011 | Li | H02K 3/28 318/400.27 |
| 2011/0175471 A1* | 7/2011 | Marchitto | H02K 3/521 310/71 |
| 2012/0235523 A1* | 9/2012 | Moya | H02K 1/148 310/71 |
| 2013/0099609 A1* | 4/2013 | Ikeno | H02K 29/08 310/52 |
| 2013/0181569 A1 | 7/2013 | Nakagawa et al. | |
| 2013/0221783 A1 | 8/2013 | Okamura | |
| 2013/0257200 A1 | 10/2013 | Nakayama et al. | |
| 2014/0042849 A1* | 2/2014 | Nishikata | H02K 5/04 310/91 |
| 2015/0188386 A1* | 7/2015 | Horng | F16C 43/02 310/90 |
| 2016/0079825 A1 | 3/2016 | Sawada et al. | |
| 2017/0066470 A1* | 3/2017 | Asao | B62D 5/0406 |

FOREIGN PATENT DOCUMENTS

| | | | |
|---|---|---|---|
| JP | 2011120413 A | * | 6/2011 |
| JP | 2012110203 A | | 6/2012 |
| JP | 2013-211945 A | | 10/2013 |
| JP | 2013223297 A | | 10/2013 |
| JP | 2013247761 A | | 12/2013 |
| JP | 2013258821 A | | 12/2013 |
| JP | 5490290 B1 | | 5/2014 |
| JP | 2014204528 A | | 10/2014 |
| KR | 10-0866655 B1 | | 11/2008 |
| KR | 10-2011-0048661 A | | 5/2011 |
| KR | 20-0456092 Y1 | | 10/2011 |
| WO | WO-2012141417 A1 | * | 10/2012 ............... H02K 3/28 |

OTHER PUBLICATIONS

JP2011120413A (English Translation) (Year: 2011).*
International Search Report for PCT/KR2015/009649 dated Dec. 23, 2015 from Korean Intellectual Property Office.

* cited by examiner

[Fig. 7]
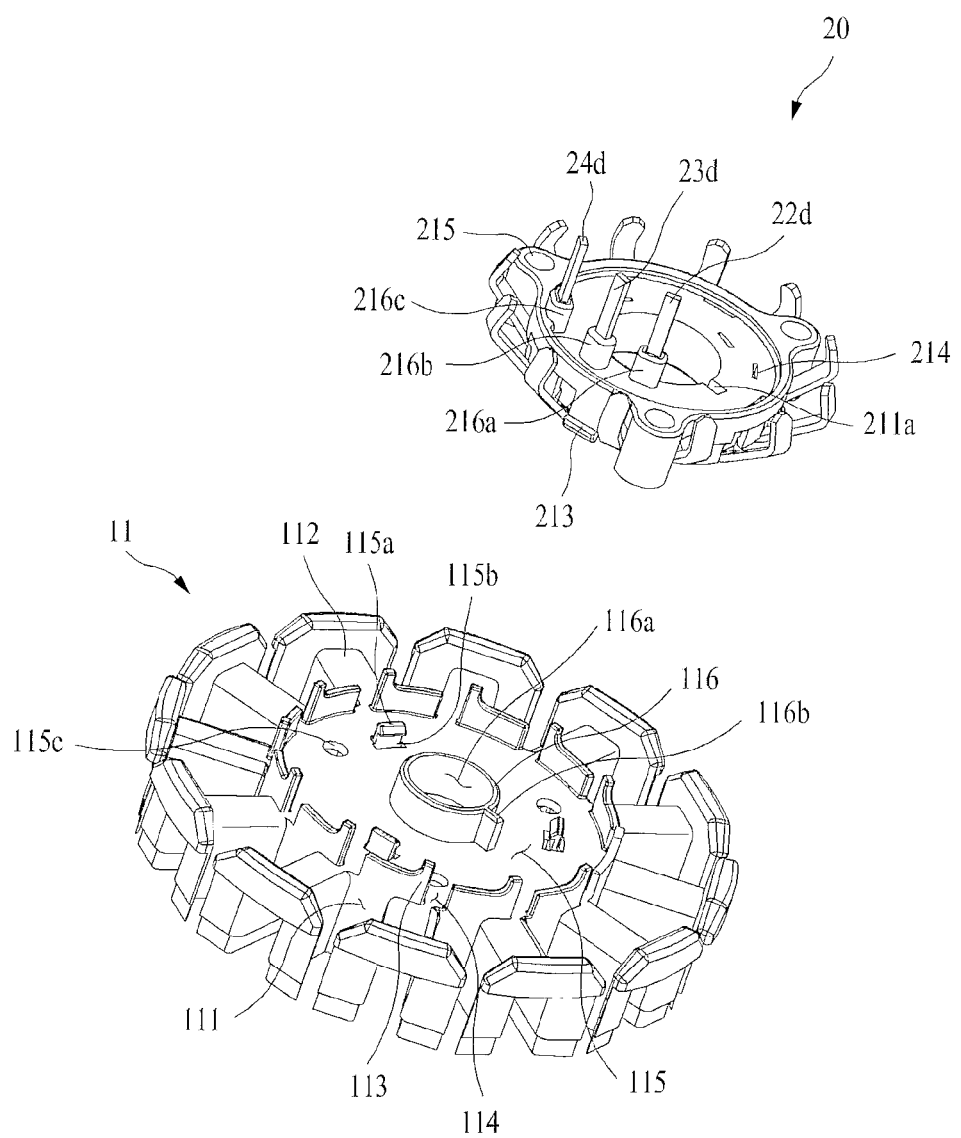

[Fig. 8]
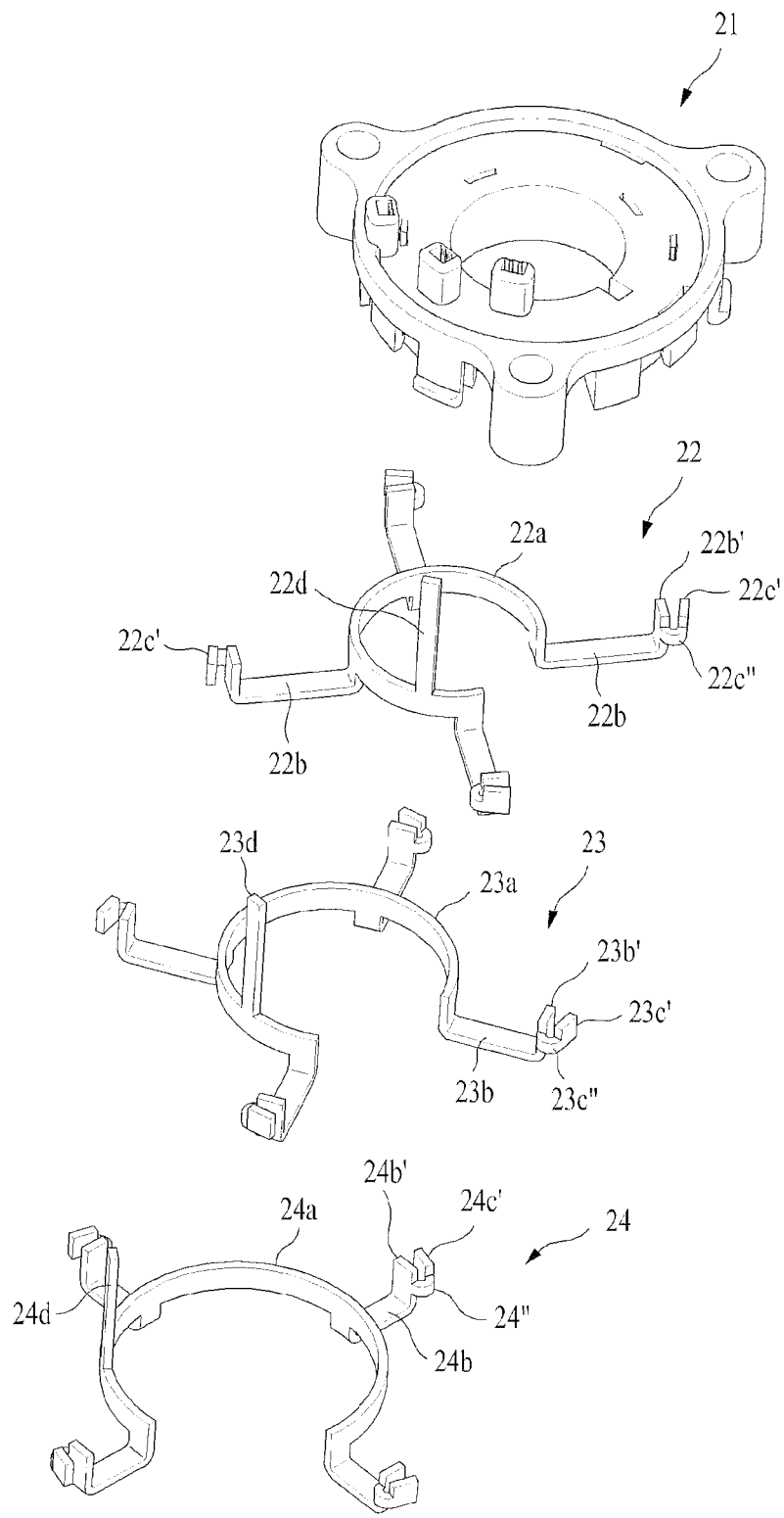

[Fig. 9]
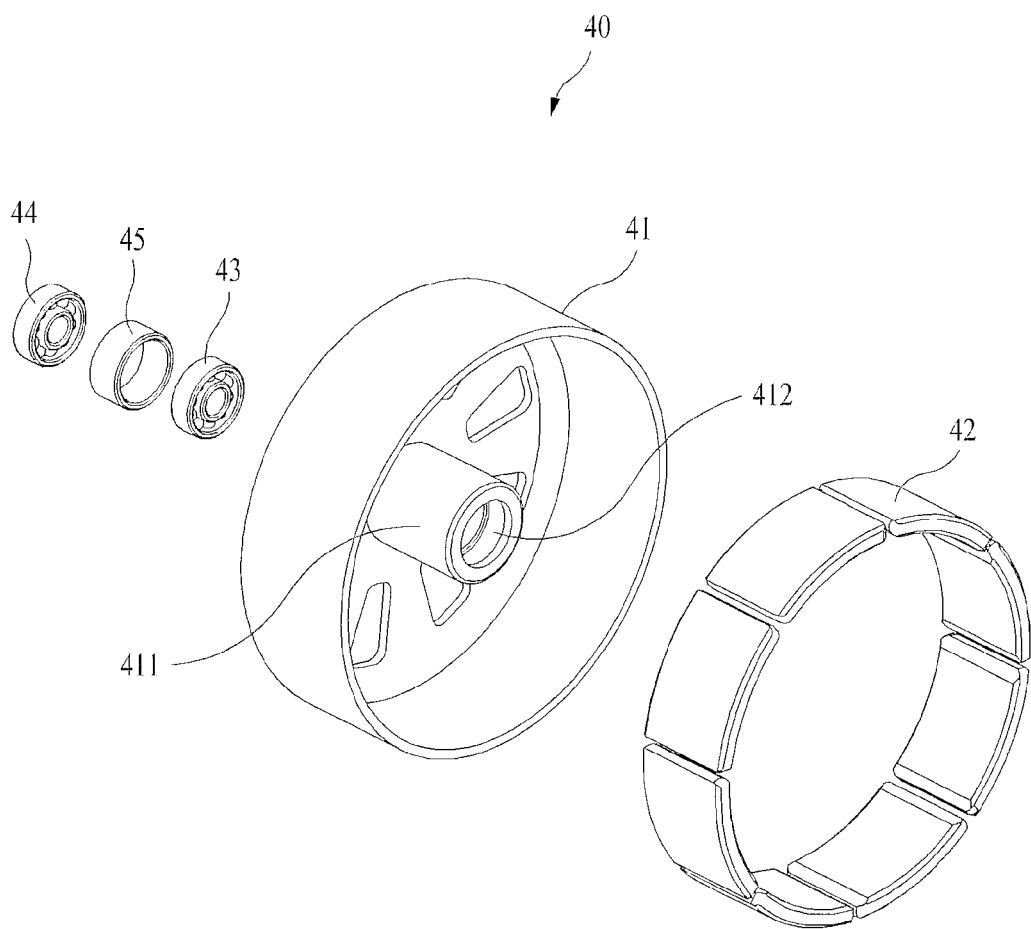

MOTOR WITH BUS-BAR ASSEMBLY

CROSS REFERENCE TO PRIOR APPLICATIONS

This application is a National Stage Application of PCT International Patent Application No. PCT/KR2015/009649 filed on Sep. 15, 2015, under 35 U.S.C. § 371, which claims priority to Korean Patent Application No. 10-2014-0172595 filed on Dec. 4, 2014, which are all hereby incorporated by reference in their entirety.

TECHNICAL FIELD

The present invention relates to a motor. More particularly, the present invention relates to a motor, which has a bus-bar assembly of a new structure, thus having improved workability and productivity.

BACKGROUND ART

In general, a 3-phase brushless DC motor (BLDC motor) is configured such that a coil wound around a stator core is connected according to each phase and then is connected to a power terminal or a control circuit. For such an electrical connection, many BLDC motors adopt a bus-bar structure.

As the related art, Korean Patent No. 10-0866655 discloses a bus-bar apparatus including a terminal assembly and a terminal mold for a coil connection structure. The cited document is problematic in that an end of a coil wound around each tooth should be individually connected to a connecting terminal of a bus-bar, so that workability is deteriorated and it is difficult to couple a bus-bar to a stator assembly.

As another related art, a bus-bar apparatus disclosed in Korean Utility Model Registration No. 20-0456092 proposes an improved connection structure for a power terminal. However, this is problematic in that the structure of a power connector is complicated, and an end of each coil should be individually connected to a bus-bar as in the above related art, so that workability is reduced.

Therefore, in order to solve the above-mentioned problems, the inventors propose a bus-bar assembly, which is configured to ensure easier assembly, thus being capable of improving workability.

DISCLOSURE OF INVENTION

Technical Problem

An embodiment of the present invention is directed to a motor, which adopts a bus-bar assembly of a new structure, thus having improved workability and productivity.

The above and other objects of the present invention will be easily achieved by the following detailed description.

Solution to Problem

According to an aspect of the present invention, a motor may include a stator assembly including a stator core, an upper insulator covering and insulating an upper portion of the stator core, and a lower insulator covering and insulating a lower portion of the stator core; and a bus-bar assembly including a bus-bar having a plurality of connecting terminals formed on a circular bus and a contact portion electrically connected to a coil, and a bus-bar housing accommodating the bus-bar therein, wherein the bus-bar housing may be coupled to a bus-bar seat defined in a central portion of the upper insulator.

According to another aspect of the present invention, the motor may further include a PCB housing coupled to an upper portion of the bus-bar housing, the PCB housing including a PCB therein, a power connecting portion formed on the bus of the bus-bar assembly being electrically connected to the PCB.

According to a further aspect of the present invention, the motor may further include a shaft secured to a central portion of the bus-bar housing in such a way as to protrude downwards, wherein the shaft may pass through both a shaft passing portion formed in a central portion of the bus-bar housing and a shaft passing portion formed in a central portion of the bus-bar seat.

According to yet another aspect of the present invention, the motor may further include a rotor assembly, which has a rotor housing, a plurality of magnets provided on an inner wall of the rotor housing, an inner protrusion provided on a central portion of the rotor housing in such a way as to protrude upwards, and a bearing coupled to the inner protrusion, wherein the inner protrusion may be coupled to the shaft passing portion of the bus-bar housing.

According to another aspect of the present invention, the inner protrusion may be coupled to the shaft passing portion of the bus-bar seat.

According to another aspect of the present invention, the contact portion and the coil may be further secured to each other by fusing welding.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects of Invention

According to the present invention, the motor adopts the bus-bar assembly of the new structure, which is improved in workability and productivity.

BRIEF DESCRIPTION OF DRAWINGS

FIG. 7 is a perspective view showing an upper insulator and the bus-bar assembly of the motor according to the present invention;

FIG. 8 is an exploded perspective view showing the bus-bar assembly of the motor according to the present invention and showing another example of the contact portion; and FIG. 9 is an exploded perspective view showing a rotor assembly of the motor according to the present invention.

MODE FOR THE INVENTION

Figure 1:
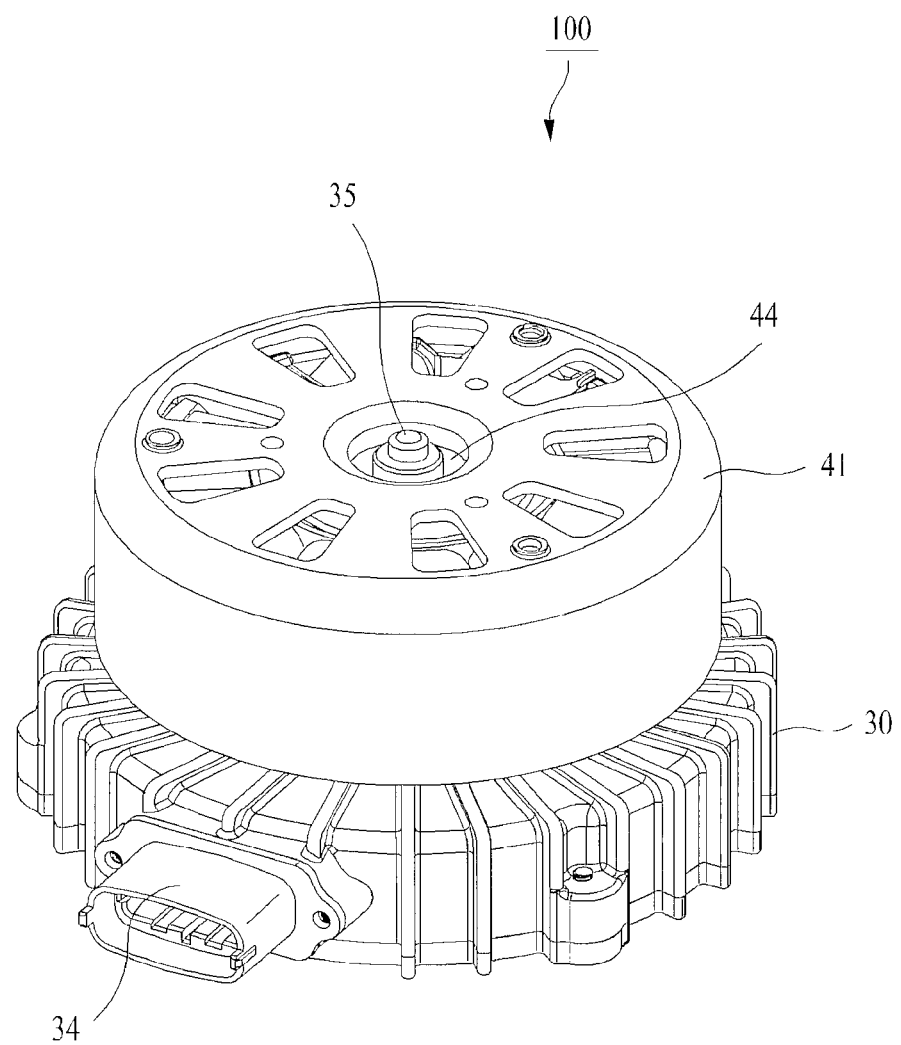
FIG. 1 is a perspective view showing a motor according to the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
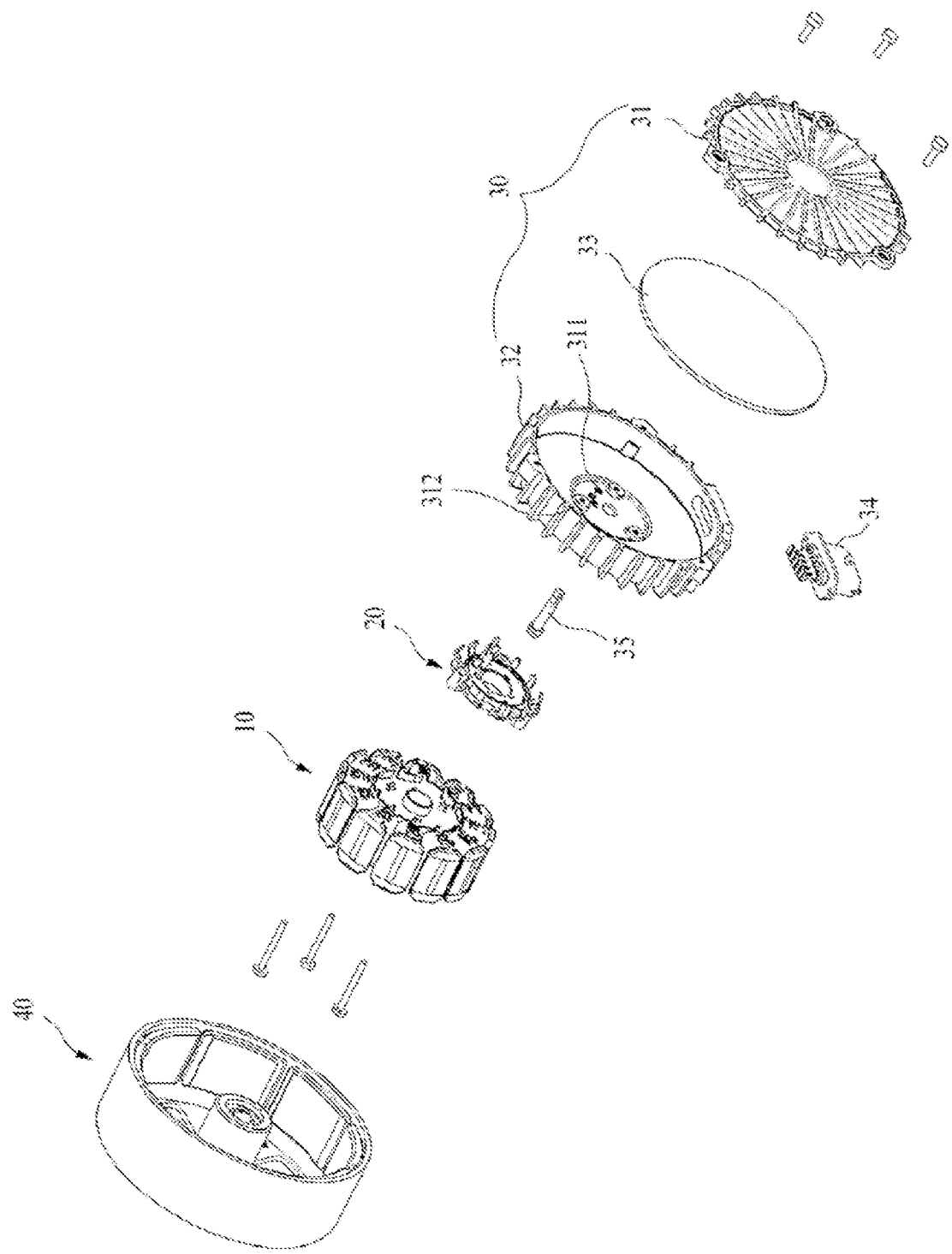
FIG. 2 is an exploded perspective view showing the motor according to the present invention.

FIG. 1 is a perspective view showing a motor 100 according to the present invention, and FIG. 2 is an exploded perspective view showing the motor according to the present invention.

As shown in FIGS. 1 and 2, the motor according to the present invention includes a stator assembly 10, a bus-bar assembly 20, a printed circuit board (hereinafter referred to as a 'PCB') housing 30, and a rotor assembly 40.

The stator assembly 10 includes upper and lower insulators surrounding the stator core, and a coil wound thereon. The bus-bar assembly 20 is coupled to the upper insulator of the stator assembly 10. The PCB housing 30 is coupled to an upper portion of the stator assembly 20. Herein, the "lower portion" designates a location near the rotor assembly 40 of the motor 100, while the "upper portion" means a location near the PCB housing 30 of the motor 100.

The PCB housing 30 is formed by combining an upper PCB housing 31 and a lower PCB housing 32, with a PCB 33 located between the upper and lower PCB housings 31 and 32. Three power connecting portion 22d, 23d and 24d (see FIG. 3) that protrude upwards from the bus-bar assembly 20 are inserted into corresponding power-terminal inserting portions 311 that are formed on the lower PCB housing 32 so as to be electrically connected to the PCB 33.

As shown in FIG. 2, a long bolt is inserted into a bolt inserting portion 312 formed on the lower PCB housing 32. The stator assembly 10, the bus-bar assembly 20, and the PCB housing 30 may be coupled together via the long bolt. A connector 34 is used to electrically connect the PCB 33 to an external power source or the like. A shaft 35 is fixedly coupled to a central portion of the lower PCB housing 32. A bearing of the rotor assembly 40 is coupled to the shaft 35 to allow the rotation of the rotor assembly 40.

Figure 3:
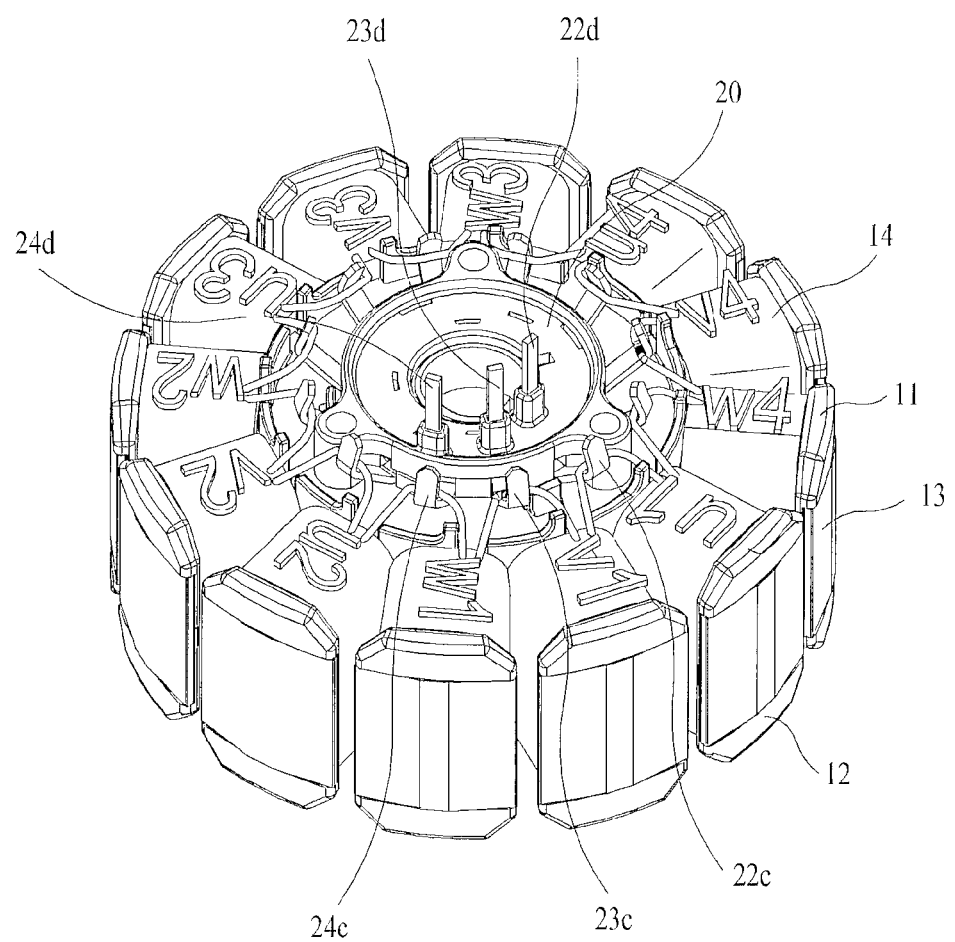
FIG. 3 is a perspective view showing a state where a bus-bar assembly is coupled to a stator assembly in the motor according to the present invention.

FIG. 3 is a perspective view showing a state where the bus-bar assembly 20 is coupled to the stator assembly 10 in the motor 100 according to the present invention.

As shown in FIG. 3, the bus-bar assembly 20 of the motor according to the present invention is coupled to the upper portion of the upper insulator 11 of the stator assembly 10. Particularly, the conventional bus-bar assembly is coupled just above a portion around the coil wound, while, as for the motor according to the present invention, the bus-bar assembly is coupled to the upper portion of the central portion of the stator assembly 10, thus reducing the size of the bus-bar assembly 20 and facilitating assembly.

The coil 14 wound around the stator assembly 20 is wound around a teeth insulating portion of the stator assembly 20. FIG. 3 illustrates a state where an end of the coil is wound around an adjacent tooth. The winding of the coil is shown in FIG. 3 as an exemplary embodiment of the present invention. According to this embodiment, 3-phase delta-4 parallel connection is performed for the stator assembly 20 having 12 teeth. Of course, the number of the teeth or the shape of the winding may be applied to the present invention in various ways. However, FIGS. 3 and 4 show the embodiment of the 3-phase delta-4 parallel connection.

Figure 4:
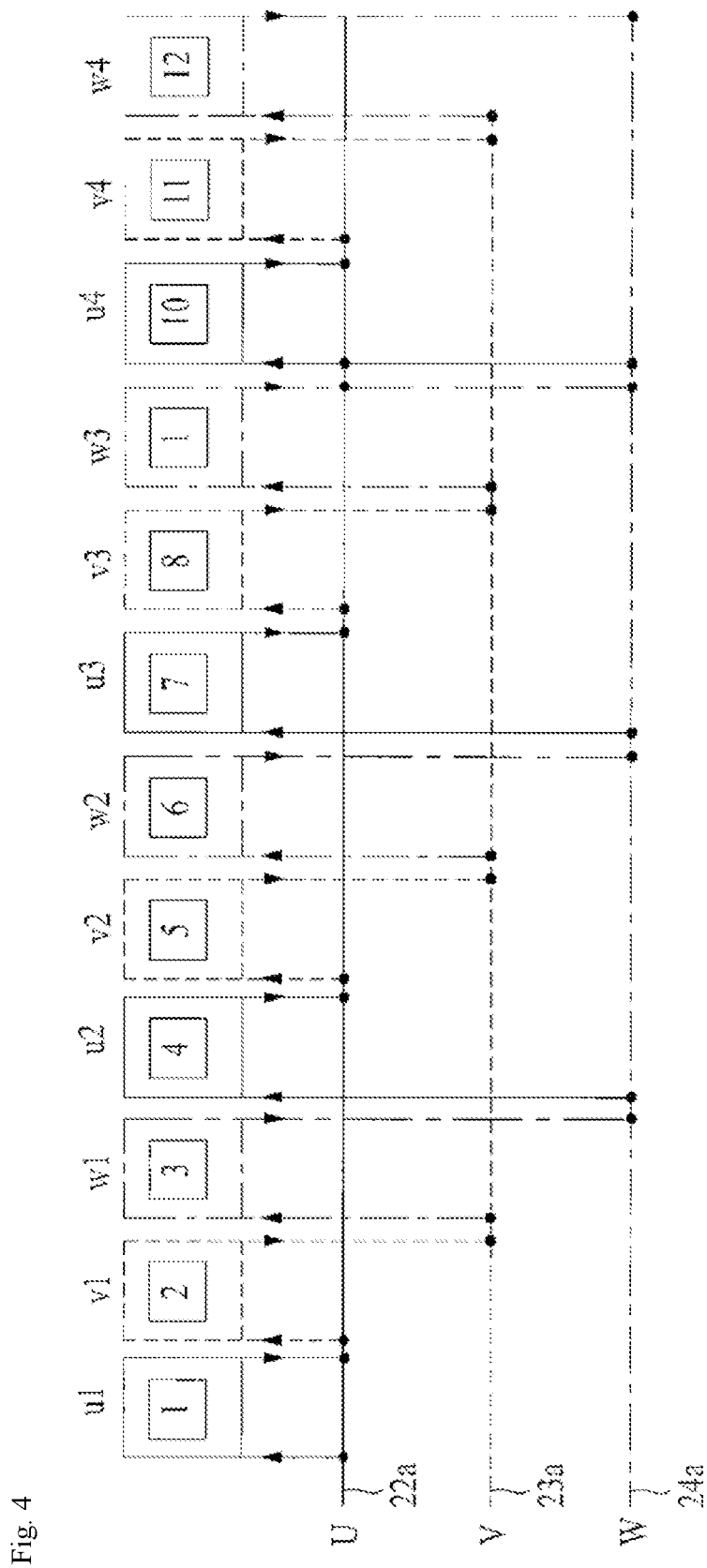
FIG. 4 is a conceptual view showing a delta-4 parallel connection diagram according to an embodiment of the present invention.

FIG. 4 is a conceptual view showing a 3-phase delta-4 parallel connection diagram according to an embodiment of the present invention.

Referring to FIGS. 3 and 4, the coil wound around a first tooth u1 is wound around a second tooth v1 adjacent thereto while making electrical contact with the first contact portion 22c of the bus-bar assembly 20. The coil wound around the second tooth v1 is wound around a third tooth w1 adjacent thereto while making electrical contact with the second contact portion 23c. The coil wound around the third tooth w1 is wound around a fourth tooth u2 adjacent thereto while making electrical contact with the third contact portion 24c. By repeating such a process, the coil wound around a twelfth tooth w4 is electrically connected to the end of the coil of the first tooth. According to such a winding and connecting sequence, the 3-phase delta-4 parallel connection is formed. The first tooth u1, a fourth tooth u2, a seventh tooth u3, and a tenth tooth u4, which are the same phase, are electrically connected by a first bus 22a. Likewise, the second tooth v1, a fifth tooth v2, an eighth tooth v3, and an eleventh tooth v4 are electrically connected by a second bus 23a, and the third tooth w1, a sixth tooth w2, a ninth tooth w3, and the twelfth tooth w4 are electrically connected by a third bus 24a.

Figure 5:
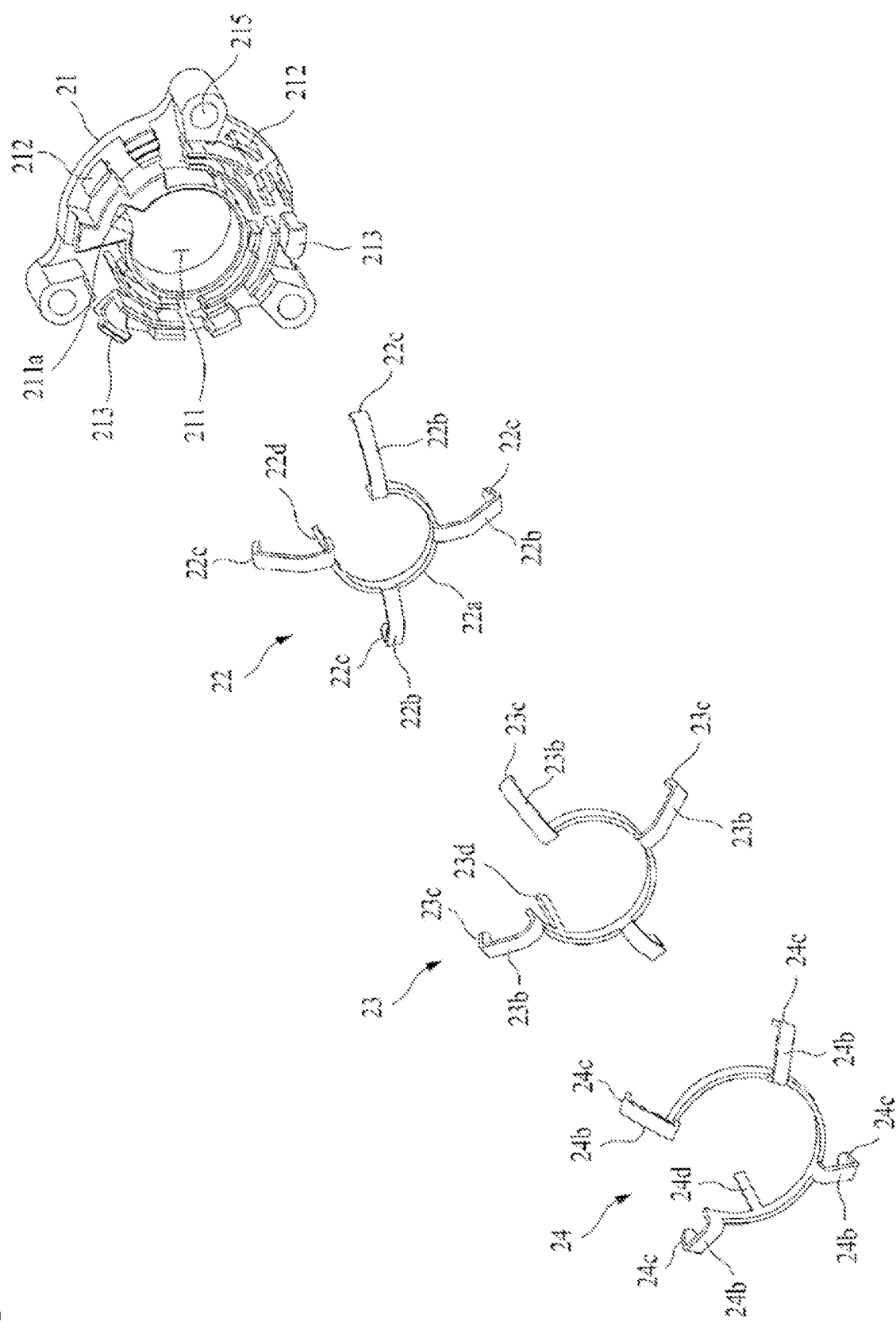
FIG. 5 is an exploded perspective view showing the bus-bar assembly of the motor according to the present invention.

FIG. 5 is an exploded perspective view showing the bus-bar assembly 20 of the motor 100 according to the present invention.

As shown in FIG. 5, the bus-bar assembly 20 of the present invention is composed of a bus-bar housing 21, a first bus-bar 22, a second bus-bar 23, and a third bus-bar 24. Of course, the number of bus-bars may be changed depending on a connection method. However, an example having three bus-bars will be described herein as in the above-mentioned embodiment. Generally, in the case of the 3-phase connection, three or four bus-bars are used. In order to obtain the actual profit of the bus-bar structure, at least two bus-bars should be used.

A shaft passing portion 211 through which the shaft and the bearing of the rotor assembly pass is formed in a central portion of the bus-bar housing 21. A key groove 211a is formed in a part of an edge of the shaft passing portion 211. When a key 116b provided on the upper insulator 11 is inserted into the key groove 211a and then the bus-bar assembly 20 is coupled to the upper insulator 11, it is possible to take a precise position at which undesirable rotation about the central portion is prevented.

A plurality of bus guides 212 protrudes from a lower portion of the bus-bar housing 21, and is configured such that first to third buses 22, 23 and 24 are seated between the respective bus guides 212. Further, some of the bus guides 212 have at an end thereof a coupling hook 213, and a coupling groove 214 is formed at a position adjacent to the bus guide 212. Thereby, the bus-bar assembly 20 can be easily coupled to the upper insulator by coupling the coupling hook 213 to the coupling groove 115b of the upper insulator 11 and coupling the coupling hook 115a of the upper insulator 11 to the coupling groove 214.

Approximately three coupling holes 215 are formed on a periphery of the bus-bar housing 21. The number of the coupling holes may be changed as desired without being limited to three. A long bolt passes through an associated coupling hole 215 to cause the stator assembly 10, the bus-bar assembly 20, and the PCB housing 30 to be coupled with one another.

The first bus-bar 22 is used to electrically connect the coils of the same phase to each other. The first bus-bar 22 includes the circular first bus 22a and four first connecting terminals 22b that protrude radially therefrom for the 4-parallel connection. A first contact portion 22c having a slightly bent shape is formed on an end of the first connecting terminal 22b, so that the coil is caught by the first contact portion 22c to make an electric contact therewith. Further, after the winding of the coil is completed, the first contact portion 22c is bent inwards and then is firmly secured to the coil through fusing welding, thus ensuring electrical connection.

Similarly, the second bus-bar 23 is used to electrically connect the coils of the same phase to each other, and includes the circular second bus 23a and four second connecting terminals 23b that protrude radially therefrom for the 4-parallel connection. A second contact portion 23c having a slightly bent shape is formed on an end of the second connecting terminal 23b, so that the coil is caught by the second contact portion 23c to make an electric contact therewith. Further, after the winding of the coil is completed, the second contact portion 23c is bent inwards and then is firmly secured to the coil through fusing welding, thus ensuring electrical connection.

Further, the third bus-bar 24 has four third connecting terminals 24b that protrude radially from the circular third bus 24a for the 4-parallel connection. A third contact portion 24c is formed on an end of the second connecting terminal 24b, so that the coil passes through the third contact portion 24c to make an electric contact therewith. After the winding of the coil is completed, the third contact portion 24c is bent inwards and then is firmly secured to the coil through fusing welding.

First, second, and third power connecting portions 22d, 23d and 24d are formed, respectively, on the first, second, and third bus-bars 22, 23 and 24 in such a way as to protrude upwards. The first to third power connecting portions 22d, 23d, and 24d are electrically connected to the PCB 33.

Figure 6:
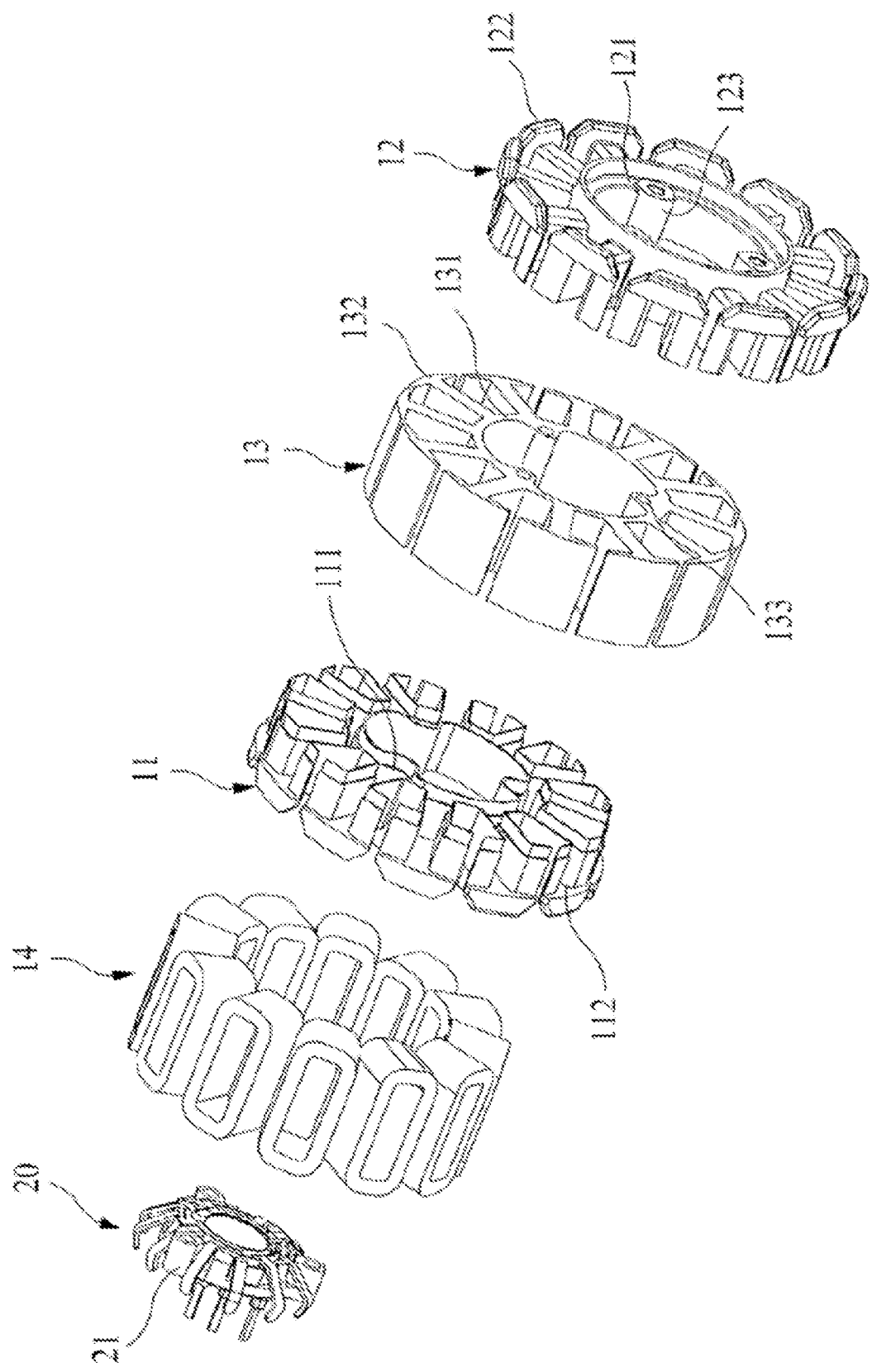
FIG. 6 is an exploded perspective view showing the stator assembly and the bus-bar assembly in the motor according to the present invention.

FIG. 6 is an exploded perspective view showing the stator assembly 10 and the bus-bar assembly 20 in the motor 100 according to the present invention As shown in FIG. 6, the stator assembly 10 according to the present invention surrounds the upper and lower portions of the stator core 13 by the upper and lower insulators 11 and 12, respectively. The stator core 13 includes a circular core base 131, teeth 31 formed radially from the circular core base 131, and a plurality of coupling holes 133 formed on an inside of the core base 131. The number of coupling holes 133 is not limited to a specific number, but three or more coupling holes 133 are preferred in terms of the stability of coupling. The teeth 132 may be formed on an outer or inner circumferential portion of the core base 131. Although twelve teeth 132 are shown in FIG. 6, this number may be changed according to a design specification. The coupling hole 133 is a portion for receiving the long bolt, and may or may not be formed in the core base 131.

An upper-base-insulating portion 111 of the upper insulator 11 is shaped to cover upper and central portions of the core base 131. Upper-teeth-insulating portions 112 are formed radially from the upper-base-insulating portion 111, thus covering and insulating the upper portions of the teeth 132. A lower-base-insulating portion 121 of the lower insulator 12 is preferably configured such that it covers the lower portion of the core base 131 but does not cover the central portion thereof, so as to save a material. A plurality of coupling holes 123 is formed in a central portion of the lower-base-insulating portion 121. The number of the coupling holes 123 is not limited to a specific number, but three or more coupling holes are preferred in terms of the stability of coupling. Of course, the coupling holes 123 may be formed in the upper-base-insulating portion 111 of the upper insulator 11. The location of the coupling holes may be optionally determined depending on a manufacturing environment. Lower-teeth-insulating portions 122 cover and insulate the lower portions of the teeth 132.

FIG. 7 is a perspective view showing the upper insulator 11 and the bus-bar assembly 20 of the motor 100 according to the present invention.

As shown in FIG. 7, the bus-bar assembly 20 of the present invention is coupled to the upper insulator 11 of the stator assembly 10. Various coupling methods are possible. For example, FIG. 7 shows an embodiment wherein the coupling hooks 213 of the bus-bar assembly 20 are coupled to the coupling grooves 115b of the upper insulator 11, and the coupling hooks 115a formed on the upper insulator 11 are coupled to the coupling grooves 214 formed in the bus-bar assembly 20.

The upper-base-insulating portion 111 covers the upper portion of the core base 131 of the stator core 13, and is shaped to cover the central portion thereof except a portion corresponding to a central protrusion 116 of the upper-base-insulating portion 111. The coil wound around the upper-teeth-insulating portion 112 is guided by a plurality of coil guides 113 formed on the upper-base-insulating portion 111 and coil passages 114 defined by the coil guides 113 to pass through the first, second, and third contact portions 22c, 23c and 24c of the bus-bar assembly 20. A portion on the upper portion of the upper-base-insulating portion 111 at which the bus-bar assembly 20 is located is referred to as a bus-bar seat 115. The central protrusion 116 having a shaft passing portion 116a is provided on the central portion of the upper-base-insulating portion 111. This central protrusion 116 is coupled to the shaft passing portion 211 of the bus-bar housing. Here, the key 116b formed on the central protrusion 116 is inserted into the key groove 211a formed in the shaft passing portion 211, thus allowing the bus-bar housing to be coupled to a given position. A plurality of coupling holes 115c is formed in the bus-bar seat 115 to correspond in position to the coupling holes 215 of the bus-bar housing 21. The long bolt is inserted into each coupling hole 115c.

The first, second, and third power connecting portions 22d, 23d, and 24d protruding upwards from the first, second, and third buses 22a, 23a, and 24a are guided and protruded upwards from the bus-bar assembly 20 via first, second, and third power-terminal receiving portions 216a, 216b, and 216c that protrude upwards from the bus-bar housing 21.

A sequence in which the upper insulator 11 and the bus-bar assembly 20 configured as such are coupled to each other and the coil is wound will be described below with reference to FIG. 6.

First, in the state where the upper and lower insulators 11 and 12 are coupled to the stator core 13, the bus-bar assembly 20 is coupled to the upper insulator 11.

Next, the coil 14 is wound. If the coil 14 is wound around each tooth, the end of the coil 14 passes through the coil passage 114 between the coil guides 113, and then passes through the contact portion provided on the end of each of the connecting terminals protruding radially from the bus-bar assembly 20 while making contact therewith. Subsequently, the winding is performed for an adjacent tooth. By repeating such a process, the winding is completed for all of the twelve teeth. Next, the fusing welding is performed at a junction between the coil 14 and the contact portion, thus improving the reliability of an electrical connection.

As such, the easier coupling of the bus-bar assembly 20 is possible, thus ensuring an electrical connection.

FIG. 8 is an exploded perspective view showing the bus bar assembly 20 of the motor according to the present invention, and shows another example of the contact portions 22c, 23c and 24c.

The aforementioned contact portions 22c, 23c and 24c have a shape that is bent to the upward inner side at the distal end of the connection terminals 22b, 23b and 24b. The coils pass through the contact portions, the contact portions are clamped when fuse-welding, and after the contact portions are further bent over the coils, the fuse-welding is performed. The shape of the contact portions illustrated in FIG. 8 is intended to improve the workability at the time of the clamping and fuse-welding.

According to another embodiment of the contact portions, the contact portions include bent portions 22b', 23b' and 24b' having a shape bent upward at the distal ends of the connection terminals 22b, 23b and 24b, contact pieces 22c', 23c' and 24c' which are spaced from the bent portions at fixed intervals and are located parallel or substantially parallel to the bent portions, and connection pieces 22c", 23c" and 24c" which connect the bent portions with the contact pieces. In another embodiment of the present invention, the first bent portions 22b', the first contact piece 22c' and the first connection piece 22c" form a first contact portion 22c. The second bent portion 23b', the second contact piece 23c' and the second connection piece 23c" form a second contact portion 23c. The third bent portion 24b', the third contact piece 24c' and the third connection piece 24c" form a third contact portion 24c.

The connection pieces 22c", 23c" and 24c" are formed to be located at a slightly lower part of the uppermost part of the bent portions 22b', 23b' and 24b' and the contact pieces 22c', 23c' and 24c'. The reason is to ensure that the coils are introduced into the tip of the connection pieces and are guided between the bent portions and the contact pieces to allow the accurate and rapid operation to be easily performed. The coils clamp the bent portions and the contact pieces a radial direction (a direction of the connection terminal) while passing between the bent portion and the contact piece, thereby performing the fusing. Thus, there is an advantage that the work is further facilitated than the above-mentioned in which the direction of the clamping needs to be in the vertical direction.

FIG. 9 is an exploded perspective view showing the rotor assembly 40 of the motor 100 according to the present invention.

Referring to FIG. 9, the rotor assembly 40 of the present invention includes a rotor housing 41, a magnet 42, a first bearing 43, a second bearing 44, and a spacer 45.

A plurality of magnets 42 may be applied and attached to an inner surface of a sidewall of the rotor housing 41 at regular intervals. An inner protrusion 411 is provided in a central portion of the rotor housing 41 in such a way as to protrude therefrom, with a bearing seat 412 defined in a central portion of the inner protrusion 411.

The first and second bearings 43 and 44 are fixedly press-fitted into the bearing seat 412, and the spacer 45 is provided between the first and second bearings 43 and 44, thus securing the first and second bearings 43 and 44 in place while keeping a constant interval therebetween. Of course, the number of bearings may be changed variously without being limited to two. The fixed shaft 35 is coupled to the inner circumferences of the first and second bearings 43 and 44, thus causing the rotor assembly 40 to rotate about the shaft 35.

While the present invention has been described with respect to the specific embodiments, it will be apparent to those skilled in the art that various changes and modifications may be made without departing from the spirit and scope of the invention as defined in the following claims.

The invention claimed is:

1. A motor, comprising:
   a stator assembly including a stator core, an upper insulator covering and insulating an upper portion of the stator core, and a lower insulator covering and insulating a lower portion of the stator core;
   a bus-bar assembly including a bus-bar having a plurality of connecting terminals formed on a circular bus and a contact portion electrically connected to a coil, and a bus-bar housing accommodating the bus-bar therein;
   a PCB housing coupled to an upper portion of the bus-bar housing, wherein the PCB housing including a PCB therein has a power connecting portion formed on the bus of the bus-bar assembly being electrically connected to the PCB,
   wherein the PCB housing is formed by combining an upper PCB housing and a lower PCB housing, the PCB located between the upper and lower PCB housings,
   wherein the stator assembly, the bus-bar assembly, and the PCB housing are coupled together via a bolt,
   wherein the contact portion has
      a bent portion formed by bending distal ends of the connecting terminals upward,
      a contact piece located to face the bent portion, and
      a connection piece which connects the bent portion with the contact piece,
   wherein the bus-bar housing is coupled to a bus-bar seat defined in a central portion of the upper insulator;
   a shaft secured to a central portion of the bus-bar housing in such a way as to protrude downwards and directly and fixedly coupled to a central portion of the lower PCB housing, wherein the shaft is configured to pass through both a shaft passing portion formed in the central portion of the bus-bar housing and a shaft passing portion formed in a central portion of the bus-bar seat; and
   a rotor assembly including a rotor housing, a plurality of magnets provided on an inner wall of the rotor housing, an inner protrusion provided on a central portion of the rotor housing in such a way as to protrude upwards, bearings fixedly press-fitted into a bearing seat which is defined in an inner portion of the inner protrusion of the rotor housing, and a spacer provided between the bearings,
   wherein the shaft is coupled to an inner circumference of each of the bearings to rotate the rotor assembly.

2. The motor of claim 1, wherein the inner protrusion is coupled to the shaft passing portion of the bus-bar seat.

3. The motor of claim 1, wherein the contact portion and the coil are further secured to each other by fusing welding.

* * * * *